Oct. 4, 1949.   J. H. VICTOR   2,483,988
FLUID SEAL
Filed April 5, 1945   2 Sheets-Sheet 1
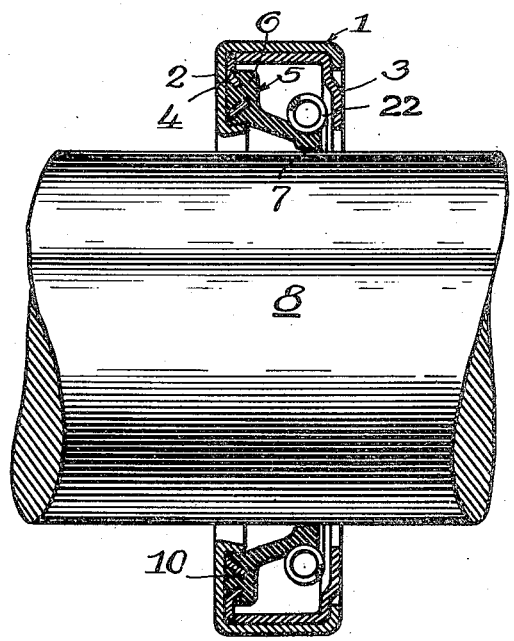
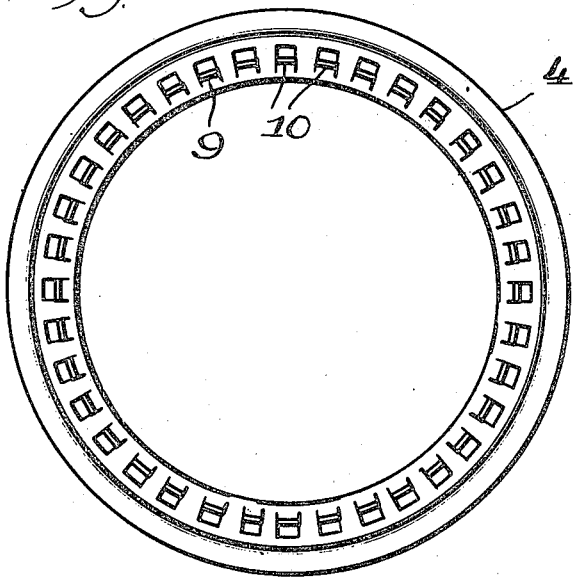
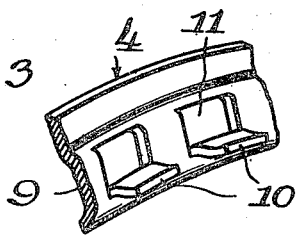
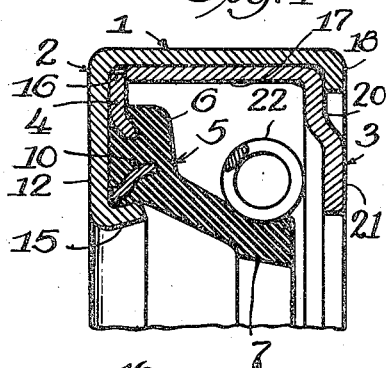
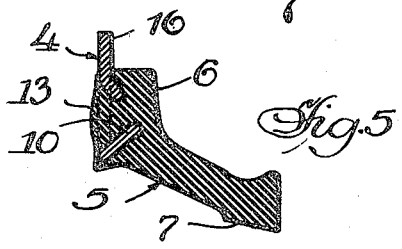
INVENTOR.
John H. Victor
BY Parkinson Lane
Attys Oct. 4, 1949.                    J. H. VICTOR                    2,483,988
                                  FLUID SEAL
Filed April 5, 1945                                         2 Sheets—Sheet 2
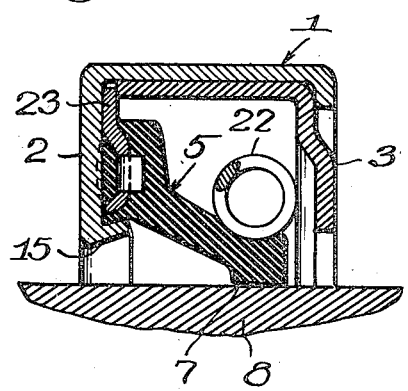
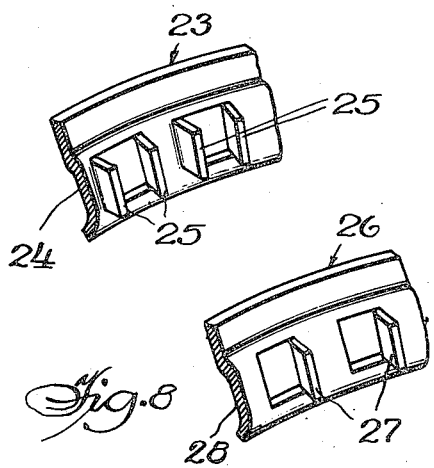
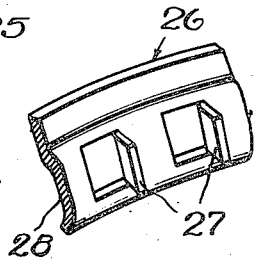
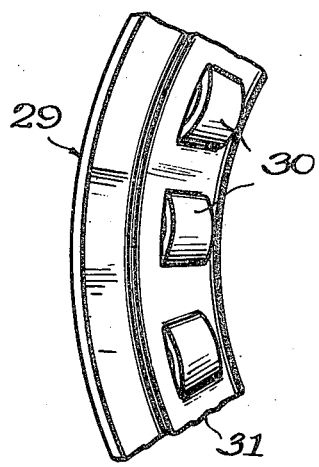
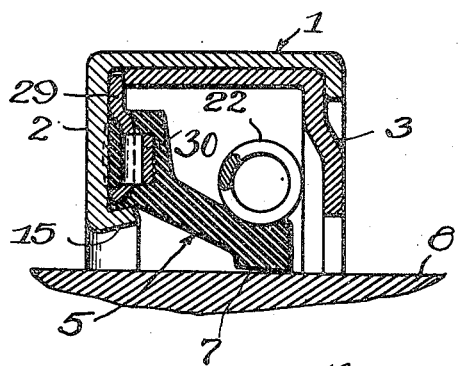
INVENTOR.
John H. Victor,
BY
Parkinson + Lane
Attys.

Patented Oct. 4, 1949

2,483,988

UNITED STATES PATENT OFFICE 2,483,988

FLUID SEAL

John H. Victor, Wilmette, Ill., assignor to Victor Manufacturing & Gasket Company, Chicago, Ill., a corporation of Illinois Application April 5, 1945, Serial No. 586,697

1 Claim. (Cl. 288—3)

The present invention relates to a novel construction of oil or fluid seals of the type adapted to seal the space between relatively rotatable parts such as a rotatable shaft and its encompassing structure, and especially to a novel means and manner of mounting the resilient sealing element within its housing or retaining shell.

Among the objects of the present invention is to provide a novel pre-formed sealing ring of a moldable plastic bonded to a novel washer or anchoring ring adapted to be securely clamped between the outer or bottom channel section and the inner or top channel section of the retaining shell in such manner as to prevent leakage therebetween of the fluid being sealed. This novel assembly provides a simplified construction that may be quickly assembled and in which the sealing element is securely anchored against relative rotation and in fluid-tight sealing contact with the outer or bottom channel section.

A further object is to provide a novel means and manner of mounting a sealing element formed of a moldable elastomer such as compounded synthetic rubber, in a unique type of oil or fluid seal assembly, as distinguished from bonding the sealing element directly to the retaining shell or housing.

The invention further comprehends a novel anchoring means including a washer to which the sealing element is bonded, provided with spaced tongues or anchoring projections for securely uniting or joining these parts, the washer having a radially extending part adapted to be clamped against rotation in the retaining shell.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in vertical cross section through the novel fluid seal assembly and showing its relationship with a rotatable shaft.

Figure 2 is a plan view of the novel washer or anchoring ring.

Figure 3 is a fragmentary enlarged view in perspective of this washer.

Figure 4 is an enlarged fragmentary view in vertical cross section of the seal assembly.

Figure 5 is a fragmentary view in vertical cross section of the reinforced sealing element prior to assembly.

Figure 6 is a view similar to Figure 4 but showing an alternate form of reinforced sealing element.

Figure 7 is an enlarged fragmentary view in perspective of the washer or anchoring ring shown in Figure 6 and Figure 8 is a similar view of a slightly modified form thereof.

Figure 9 is a view similar to Figure 6 but showing another form of washer or anchoring ring and Figure 10 is a fragmentary view in perspective of this washer or anchoring ring.

Referring more particularly to the disclosure in the drawings and to the novel embodiment selected to illustrate the invention in Figures 1 to 5, inclusive, the oil seal or grease retainer comprises a housing or retaining shell 1 consisting of an outer or bottom section 2 and an inner or top section 3 adapted to be rigidly held in telescoping relationship.

Anchored within the shell or housing is a preformed sealing member comprising a washer or ring 4 to which a sealing element 5 is bonded. This sealing element is of a resilient, moldable material such as compounded synthetic rubber or the like and provided with a radially extending anchoring part 6 and sealing lip 7 maintained in wiping and sealing contact with a shaft 8. In order to most effectively bond or join the radial part 6 to the washer, the latter is preferably formed with an annular recess or depression 9 and integral projections or tongues 10 stamped or deformed from washer 4 as shown more clearly in Figures 2 and 3. As there shown, the stamped or expanded tongues or projections 10 are embedded within the elastomer material of the sealing element during the molding operation by the elastomer material flowing into and through the openings 11 to form a sealing surface against the interior face of the radial wall 12 of the bottom channel section.

In order to prevent leakage between the radial wall 12 and the sealing element and washer to which it is bonded, the invention comprehends molding the resilient elastomer about the inner diameter or edge of the washer and the annular recess or depression 9 to such an extent as to provide a resilient compression surface 13 adapted to effect an intimate sealing contact with the interior of the radial wall 12 and the inturned end or edge 15 thereof which is crimped over and in radial pressure engagement with the sealing element. The bond formed between the radial projection 6 of the sealing element and the portion 9 of the washer and elements 10 projecting therefrom is not formed merely by the cohesive forces within the sealing element but rather includes adhesion between the elastomer in the sealing element and the metal. This adhesion is achieved by coating the metal with a bonding agent such as cement and thereafter vulcanizing the elastomer to it. Because of the added area of contact between the metal and elastomer gained through the surfaces of projections 10, an exceptionally strong bond is achieved and the elastomer will not be pulled away from the metal by stresses encountered in use of the seal. When the edge 15 of the housing is crimped or rolled to exert a radial pressure on the sealing element, some dishing of the washer may result, but the strains thereby set up in the elastomer will not be sufficient to rupture the bond between the elastomer and the metal.

The outer diameter or edge 16 of the washer 4 projects beyond the radial part 6 of the sealing element and is adapted to be rigidly clamped in anchored relation between the end of the cylindrical wall 17 of the inner or top channel section 3 and the interior face of the radial wall 12 of the outer or bottom section 1. In assembling the unit, this anchoring is accomplished after the edge 15 has been crimped over to expand or force the washer outwardly whereupon the edge 18 of the cylindrical wall 19 of this bottom section is spun or crimped over the offset 20 in the radial wall 21 of the top section. This latter wall also prevents a contractile spring 22 adapted to maintain the sealing lip 7 in sealing contact with the shaft 8, from becoming disengaged from its position surrounding the sealing lip.

Figures 6 to 10, inclusive, disclose alternate forms of pre-formed sealing members in which the clamping washers or rings are provided with modified forms of projections, tongues or the like for anchoring the sealing elements within the outer or bottom channel section 2 and the inner or top channel section 3 of the retaining shell 1. As shown in Figures 6 and 7, the washer or reinforcing ring 23 is formed with an annular recess or channel 24 from which have been stamped or expanded the projections or tongues 25. Figure 8 shows a similar washer or reinforcing ring 26 but in which only single projections or tongues 27 are stamped or expanded from the channelled portion 28.

In Figures 9 and 10 the washer or reinforcing ring 29 is merely expanded or deformed to provide the raised or embossed, curved or arcuate portions 30 formed from the annular channel 31.

In each form of the invention the washer or anchoring ring is formed or stamped in such manner as to provide projections, tongues or embossed portions to which is anchored the resilient, moldable elastomer of the sealing element, and which washer or ring is so clamped and held in assembled relation between the top and bottom channel sections, that most effective sealing is accomplished and the sealing member comprising this washer and the sealing element, is rigidly held and prevented from rotating in its retaining shell.

Having thus described my invention, I claim:

In an oil seal, a retaining shell having an outer cylindrical portion, an inner cylindrical portion and an annular portion connecting together said cylindrical portions; a metal washer having an annular recessed part and a flat part extending radially therefrom there being perforations in said recessed part rectangular in shape and spaced apart circumferentially of the washer distances approximately equal to the circumferential length of the perforations, projections standing out of the recessed part of said washer said projections being rectangular in shape and terminating in a portion disposed substantially normal to the plane of the recessed part of the washer, a sealing element encompassing the recessed part of said washer and bonded thereto and to said projections, said washer and sealing element being disposed in said shell against the annular and inner cylindrical portions thereof, said inner cylindrical portion being expanded into frusto-conical formation to dish said washer and thereby lock the same in the shell, the bond between the sealing element and washer being strong enough to prevent separation of the element and washer under the stress of said dishing, a telescoping ring engaging the outer cylindrical portion of said shell and the flat part of said washer, means for holding said ring in said shell, said means forcing said washer and the encompassing portion of said element tightly against the annular portion of said shell to form a fluidtight seal therebetween.

JOHN H. VICTOR.

REFERENCES CITED

The following references are of record in the file of this patent:

UNITED STATES PATENTS

| Number | Name | Date |
|---|---|---|
| 2,079,729 | Balfe | May 11, 1937 |
| 2,145,928 | Heinze | Feb. 7, 1939 |
| 2,264,062 | Wilder | Nov. 25, 1941 |
| 2,289,659 | Kosatka | July 14, 1942 |
| 2,319,067 | Kosatka | May 11, 1943 |
| 2,330,104 | Antonelli | Sept. 21, 1943 |